(12) United States Patent
Wietzke

(10) Patent No.: US 11,818,551 B2
(45) Date of Patent: Nov. 14, 2023

(54) METHOD FOR ADAPTING AN OTOPLASTIC OF A HEARING AID, HEARING AID, AND HEARING AID SYSTEM

(71) Applicant: Sivantos Pte. Ltd., Singapore (SG)

(72) Inventor: Philipp Wietzke, Hoechstadt an der Aisch (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 17/522,033

(22) Filed: Nov. 9, 2021

(65) Prior Publication Data

US 2022/0070597 A1    Mar. 3, 2022

Related U.S. Application Data

(63) Continuation of application No. PCT/EP2020/062718, filed on May 7, 2020.

(30) Foreign Application Priority Data

May 9, 2019   (DE) .................. 10 2019 206 744.1

(51) Int. Cl.
*H04R 25/00* (2006.01)
*B29C 35/08* (2006.01)

(52) U.S. Cl.
CPC ....... *H04R 25/659* (2019.05); *B29C 35/0805* (2013.01); *H04R 2225/023* (2013.01); *H04R 2460/11* (2013.01)

(58) Field of Classification Search
CPC .. H04R 25/652; H04R 25/656; H04R 25/658; H04R 25/659; H04R 2225/025; H04R 2225/77; H04R 2460/17; B29C 44/1204
See application file for complete search history.

(56) References Cited

U.S. PATENT DOCUMENTS 3,925,277 A * 12/1975 Lampe ................... C08K 5/54
264/222
4,091,067 A *  5/1978 Kramer ............... H04R 25/656
264/296
4,871,502 A * 10/1989 LeBisch .............. H04R 25/656
264/225

(Continued)

FOREIGN PATENT DOCUMENTS

CA      2305241 A1 *  2/2000
DE      4233651 A1     4/1994
(Continued)

*Primary Examiner* — Ryan Robinson
(74) *Attorney, Agent, or Firm* — Laurence A. Greenberg; Werner H. Stemer; Ralph E. Locher

(57) ABSTRACT

In a method for adapting an otoplastic of a hearing aid, a flexible outer shell is provided which is made of a material that can be cured, but has not yet been cured. A housing interior is sealed at the end facing the eardrum and at the opposite end. The housing interior is connected to a pressure and curing facilitator via a pressure inlet opening. The outer shell is introduced into the ear canal of the hearing aid wearer, and an inner pressure with an increased inner pressure value is applied to the housing interior via the pressure and curing facilitator such that the outer shell lies against the ear canal wall. The hardening process of the curable material is then initiated via the pressure and curing facilitator while maintaining the inner pressure value.

13 Claims, 2 Drawing Sheets

(56) References Cited

U.S. PATENT DOCUMENTS

| | | | | |
|---|---|---|---|---|
| 4,962,537 A * | 10/1990 | Basel | ............... | H04R 25/656 |
| | | | | 381/328 |
| 5,006,055 A * | 4/1991 | Lebisch | ............... | H04R 25/656 |
| | | | | 425/389 |
| 5,131,411 A | 7/1992 | Casali et al. | | |
| 5,202,362 A * | 4/1993 | Hermele | ............... | C08J 9/32 |
| | | | | 524/588 |
| 5,321,757 A * | 6/1994 | Woodfill, Jr. | ............... | H04R 25/659 |
| | | | | 381/328 |
| 5,333,622 A | 8/1994 | Casali et al. | | |
| 5,455,994 A | 10/1995 | Termeer et al. | | |
| 5,530,763 A | 6/1996 | Aebi et al. | | |
| 6,473,512 B1 | 10/2002 | Juneau et al. | | |
| 7,715,572 B2 * | 5/2010 | Solomito, Jr. | ............... | H04R 1/1016 |
| | | | | 381/322 |
| 9,338,568 B2 * | 5/2016 | van Hal | ............... | H04R 25/658 |
| 9,936,314 B2 | 4/2018 | Rasmussen et al. | | |
| 10,034,105 B2 * | 7/2018 | Higgins | ............... | H04R 25/652 |
| 10,158,933 B2 * | 12/2018 | Prevoir | ............... | H04R 1/1016 |
| 10,284,975 B2 | 5/2019 | Higgins et al. | | |
| 10,805,747 B2 * | 10/2020 | Thumm | ............... | H04R 25/659 |
| 2006/0188119 A1 * | 8/2006 | Parker | ............... | H04R 25/659 |
| | | | | 381/322 |
| 2016/0317352 A1 * | 11/2016 | Blumer | ............... | A61F 11/10 |
| 2017/0311069 A1 | 10/2017 | Prevoir et al. | | |

FOREIGN PATENT DOCUMENTS

| | | | | |
|---|---|---|---|---|
| DE | 19834849 A1 | | 2/2000 | |
| EP | 0629101 A1 | | 12/1994 | |
| EP | 3113520 A1 | | 1/2017 | |
| GB | 2203379 A | * | 10/1988 | ......... B29C 35/0888 |
| WO | 9203894 A1 | | 3/1992 | |
| WO | 02067629 A2 | | 8/2002 | |

* cited by examiner

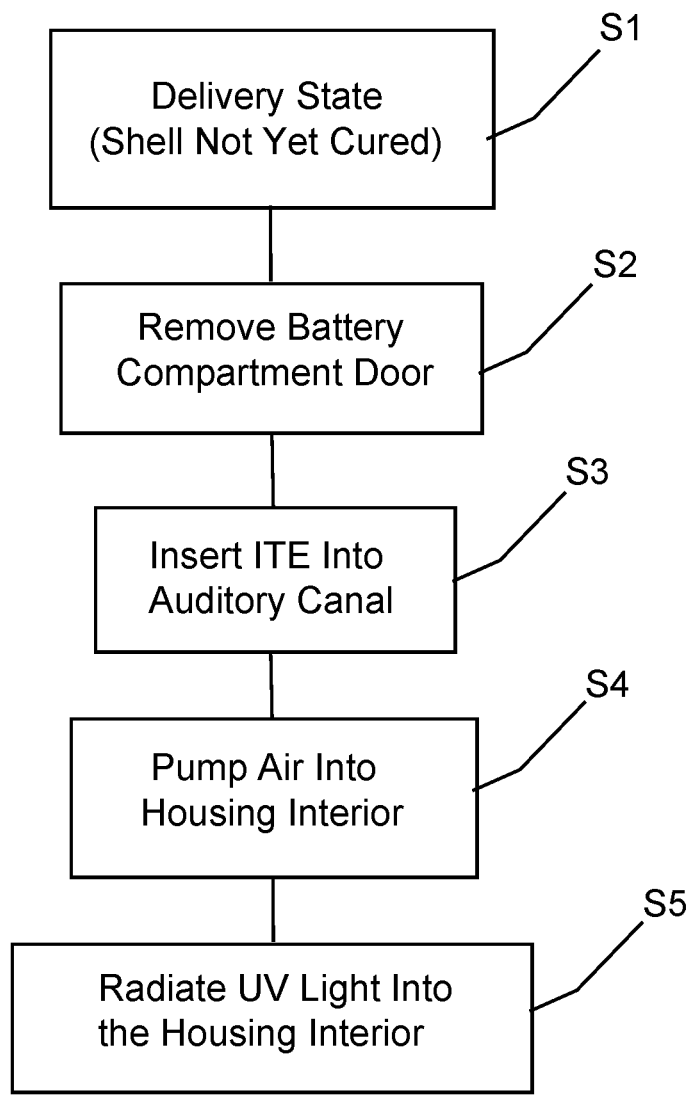

METHOD FOR ADAPTING AN OTOPLASTIC OF A HEARING AID, HEARING AID, AND HEARING AID SYSTEM

CROSS-REFERENCE TO RELATED APPLICATION

This application is a continuation, under 35 U.S.C. § 120, of copending International Patent Application PCT/EP2020/062718, filed May 7, 2020, which designated the United States; this application also claims the priority, under 35 U.S.C. § 119, of German Patent Application DE 10 2019 206 744.1, filed May 9, 2019; the prior applications are herewith incorporated by reference in their entirety.

FIELD AND BACKGROUND OF THE INVENTION

The invention relates to a method for adapting an otoplastic of a hearing aid, in particular an in-the-ear hearing aid, and such a hearing aid. Furthermore, the invention relates to a hearing aid system with such a hearing aid.

Hearing aids typically have a loudspeaker, also referred to as a "receiver," by means of which acoustic signals, i.e., sound, are provided to the sense of hearing of a user (also: wearer) of the hearing aid. In particular in the form of hearing aid devices, hearing aids are used to care for persons having hearing impairment (also: hardness of hearing). In this case, hearing aids usually comprise at least one microphone for acquiring ambient sound and a signal processor connected downstream thereof (also: signal processing unit) for signal processing. The processing is typically frequency-specific processing (in particular filtering and/or amplification or damping) of the signals transmitted by the microphone. The signal processor passes on the processed signals to the loudspeaker for output to the sense of hearing. In the case of hearing aid devices, depending on the hearing impairment, the loudspeaker can also be replaced by another output transducer, for example, a bone vibrator or a cochlear implant for mechanical or electrical stimulation of the sense of hearing.

Hearing aids, in particular hearing aid devices, are typically designed in two basic embodiments, namely as so-called behind-the-ear (BTE, BtE) hearing aids or as in-the-ear (ITE, ItE) hearing aids. In the first basic embodiment, the at least one microphone—typically at least two microphones—and the signal processor and normally an energy source are arranged in a housing to be worn behind the pinna. The sound output takes place via the loudspeaker, which is arranged in a typical design in this housing, via a sound tube to the ear. Alternatively, the loudspeaker is moved outside this housing and is worn in the auditory canal. In the other embodiment, microphone, signal processor, and loudspeaker and an energy source are arranged in a housing to be worn in the auditory canal. The embodiment as an ItE hearing aid has the advantage here that the sound can be best approximated to the natural sound impression of the ear.

In the case of an ItE hearing aid, an outer shell, also referred to as a "shell", which typically forms the housing wall in contact with the auditory canal wall, is typically individually adapted to the specific auditory canal shape of the hearing aid user. Such an individual outer shell is also referred to as an otoplastic. An impression of the auditory canal is generally taken and a negative mold for the outer shell to be manufactured is derived therefrom. An aid matched to the auditory canal of the wearer and a bonding material are introduced into the auditory canal of the wearer for this purpose according to international patent application WO 02/067629 A2. After the material has cured, a negative is manufactured and after the processing of this negative, if necessary, and the insertion of the hearing aid or a hearing aid replacement therein, the support is produced. A similar method is known from U.S. Pat. No. 5,455,994, in which an auxiliary element, the cross section of which is larger than that of the auditory canal, is inserted into the auditory canal to produce an in-the-ear hearing aid. As a result thereof, the auditory canal is expanded. Subsequently, a hollow ventilation tube is inserted into the auditory canal, after which the auditory canal is filled with a viscous material. After the viscous material has solidified, the mold is removed from the auditory canal. The ventilation tube ensures that air is introduced into a space behind the mold. The mold thus formed has a cross section which is larger than the cross section of the auditory canal. Subsequently, a housing is produced for the hearing aid, wherein the mold is used as a template. The hearing aid thus fits tightly into the auditory canal, which improves the wearing comfort. The auxiliary element used in this method has a cylindrical wall which is provided with a plurality of openings to enable the passage of the viscous material into the spaces between the auxiliary element and the wall of the auditory canal. The auxiliary element furthermore comprises a sleeve for guiding the ventilation tube.

Forming a hearing aid by way of in situ molding of a material curing at room temperature around hearing aid components is known from international patent application WO 92/03894 A1. The in situ molding of the customer-specific hearing aid offers an acoustic and comfortable fit and minimizes the processing using multiple impression and casting methods. Comparable methods are known from U.S. Pat. Nos. 5,131,411 and 5,333,622, in which an expanding foam material is used for negative molding of the auditory canal. A similar method is also known from German published patent application DE 4 233 651 A1.

U.S. Pat. No. 10,034,105 B2 describes articles and associated devices and methods for in situ assembly, which comprise a flexible sleeve, a housing arrangement fastened to the flexible sleeve, a light source arranged in the flexible sleeve, and a photo-curable resin contained in the flexible sleeve. The flexible envelope can consist of elastomer. A transducer can be arranged in the housing arrangement. A comparable invention is also known from U.S. Pat. No. 10,284,975 B2.

In the case of the production by means of so-called "rapid manufacturing" methods, for example a 3D printing method, the impression is scanned and a CAD model is created therefrom. This is linked in principle to a certain amount of effort. A BtE hearing aid can also have an otoplastic, by means of which a particularly good seat of the sound output of the sound tube or the loudspeaker worn in the auditory canal is to be achieved. For example, forming an auditory canal seal of a hearing aid at least partially from a moldable material which is not yet cured, and which can be molded thereon upon insertion into the auditory canal and subsequently cured, is known from U.S. Pat. No. 9,936,314 B2.

An adaptable otoplastic for adaptation to the outer ear and/or the auditory canal of a user is described in patent publication US 2016/0317352 A1. The otoplastic has a body which is formed from a photocurable polymer and which is provided for insertion into the outer ear canal of the user. Moreover, the otoplastic has a light source which is positioned adjoining the body. With the application of light radiation of the light source, the body can be cured so that it is applied in a fitted manner to the surface of the ear or the auditory canal of the user.

SUMMARY OF THE INVENTION

It is accordingly an object of the invention to provide a method of adapting a hearing aid otoplastic and a related hearing aid which overcome the above-mentioned disadvantages of the heretofore-known devices and methods of this general type and which provides for a simplified adaptation of a hearing aid to the anatomy of a hearing aid wearer.

With the above and other objects in view there is provided, in accordance with the invention, a method for adapting an otoplastic of a hearing aid, the method comprising:

providing a flexible outer shell formed of a curable and not-yet-cured material, the flexible outer shell forming an outer wall of the otoplastic and defining a housing interior;

sealing the housing interior at a proximal end thereof facing toward an eardrum in an intended worn state in an auditory canal of a hearing aid wearer and also sealing the housing interior at a distal end, opposite the proximal end;

connecting the housing interior via a pressure inlet opening to a pressure and curing facilitator;

inserting the outer shell into the auditory canal of the hearing aid wearer;

applying an elevated internal pressure value to the housing interior via the pressure and curing facilitator, to press the outer shell against a wall of the auditory canal; and initiating curing of the curable material via the pressure and curing facilitator while maintaining the internal pressure value.

The method according to the invention is used for adapting an otoplastic of a hearing aid, preferably by fitting the shell to the shape of at least a part of an auditory canal of a hearing aid user.

For this purpose, according to the method first a flexible outer shell formed from a material which is curable and not yet cured is provided. This outer shell forms an outer wall of the otoplastic and defines a housing interior of the hearing aid, or at least of the otoplastic. The housing interior is sealed both at its end facing toward the eardrum in the intended worn state in the auditory canal of the hearing aid wearer and also at the opposite end (also referred to as the auditory canal outlet side end). Moreover, the housing interior is connected via a pressure input opening to a pressure and curing facilitator. The outer shell is inserted into the auditory canal of the hearing aid wearer and also preferably aligned in an intended wearing position. Subsequently, an internal pressure value which is in particular increased in relation to the ambient pressure is applied to the housing interior via the pressure and curing facilitator, so that the outer shell presses against the auditory canal wall. The curing of the curable material is thereupon initiated via the pressure and curing facilitator while maintaining the internal pressure value.

The outer shell of the hearing aid is thus adapted "in situ" to the individual shape of the auditory canal of the hearing aid wearer. Measuring the auditory canal—for example by manufacturing an impression or optical methods—and subsequent separate manufacturing of the outer shell on the basis of the measurement and the effort linked thereto can thus be dispensed with. In particular, it is possible to adapt the otoplastic—thus the above-described outer shell—of the hearing aid directly (more or less without time delay which results for the separate manufacturing of the outer shell) to the auditory canal of the hearing aid wearer.

In principle, the curing can be initiated here by way of elevated temperature, which is applied, for example, via a heating element integrated in the pressure and curing facilitator, or by injection of a reaction partner, for example, an accelerant, curing agent, or the like (optionally also gaseous) into the not-yet-cured material.

However—while maintaining the internal pressure value—the outer shell is preferably subjected to radiation via the pressure and curing facilitator and the curing of the curable material is thus initiated. In this case, pressure and curing facilitator thus preferably forms a pressure and radiation facilitator.

In one expedient method variant, to seal the housing interior on the auditory canal outlet side, a terminus plate—for the case in which the housing interior is preferably used to accommodate electrical components, in particular in the form of a faceplate—and a loudspeaker on the eardrum side are installed on or in corresponding openings of the outer shell. That is to say, the terminus plate or faceplate, which in particular in an in-the-ear hearing aid (abbreviated: "ItE hearing aid") terminates the housing interior in the direction of the ear outside in a known manner, is placed on the outer shell. The outer shell preferably has a sound outlet opening on the eardrum side—i.e., at its end facing toward the eardrum in the intended worn state—into which the loudspeaker is inserted at least with a sound outlet nozzle in such a way that this sound outlet opening is closed and is preferably sealed gas-tight. The gas-tight seal of the housing interior, in particular the sound outlet opening on the eardrum side, is also used in intended operation of the hearing aid to avoid feedback based on airborne sound. For the adaptation of the hearing aid described here and hereinafter, the seal advantageously enables the elevated internal pressure value to be applied to the housing interior, so that the outer shell can be "inflated" in the scope of its flexibility to press against the auditory canal. This process is advantageously suitable both for an ItE hearing aid and also for the otoplastic of a behind-the-ear hearing aid (abbreviated: "BtE hearing aid"), which has a loudspeaker to be worn in the auditory canal. For a "classic" BtE hearing aid, in contrast, the sound outlet opening is preferably closed by means of a "blind plug", which is removed again after the adaptation.

The above-described terminus plate (in particular the faceplate) expediently has the pressure inlet opening here, into which the pressure and curing facilitator is inserted.

In one preferred refinement of the above-described method variant, the loudspeaker is preferably positioned in an intended alignment in relation to the terminus plate or faceplate by means of a holder (in particular a holding element). In particular, the loudspeaker is aligned here in dependence on the individual auditory canal shape in relation to the terminus plate or faceplate. The holder is also used here as a spacer between the loudspeaker and the terminus plate or faceplate, so that expediently under action of the elevated internal pressure value, the outer shell cannot expand in the direction of the longitudinal axis of the auditory canal—i.e., in the direction of the spacing between the terminus plate or faceplate and the loudspeaker. The above-described holder is preferably a (for example metallic) wire pin, which can be bent accordingly to align the loudspeaker in relation to the terminus plate or faceplate, or a spacer formed in particular from a plastic or the like.

In a further expedient refinement of one of the two above-described method variants, the pressure and curing facilitator is inserted gas-tight into a battery opening of the faceplate forming the pressure inlet opening. In particular, for this purpose a battery compartment door reversibly closing the battery opening is initially removed ("uninstalled") from the faceplate. An opening generally present in any case in the faceplate can thus advantageously be used to apply the elevated internal pressure value to the housing interior and subsequently be able to apply the radiation to the inside of the outer shell. An additional opening which would subsequently have to be closed again can thus advantageously be omitted.

In a further expedient method variant, in particular UV light is emitted as radiation via the pressure and radiation facilitator. The pressure and radiation facilitator preferably has a UV lamp or a UV diode for this purpose at its end connected to the housing interior—preferably at the end by means of which it is inserted into the battery opening. Alternatively, an optical fiber configured for the transport of UV light ends at this end. This optical fiber optionally has a spherical tip end, which enables the most uniform possible light distribution in the housing interior.

In a further expedient method variant, a ventilation channel between the end on the eardrum side and the end on the auditory canal outlet side of the outer shell is molded into the latter by means of an insert. The ventilation channel preferably extends over the entire length through the outer shell, so that ventilation of the auditory canal residual space remaining in the intended worn state of the hearing aid between the eardrum and the hearing aid is enabled. In a simple embodiment, the insert is a type of cord, which molds a slot-shaped or trench-shaped channel (which is therefore open toward the outside of the hearing aid) into the outer shell, in that the outer shell is pressed out around the insert under the effect of the elevated internal pressure value. Alternatively, the insert is a hose or a tube, so that a pressure equalization in the auditory canal residual space can also take place during the adaptation of the outer shell. As a further alternative, the insert is embedded in the form of a hose in the outer shell, wherein only the two ends of the hose at the end on the auditory canal outlet side or at the end on the eardrum side of the outer shell are open.

The hearing aid according to the invention has at least the above-described outer shell, i.e., the outer shell formed from the material which is curable (preferably radiation-induced) and is not yet cured in an intended intermediate manufacturing step (in particular in an intended delivery state). The outer shell forms the outer wall of the otoplastic here as described.

In addition, the otoplastic having the above-described outer shell also represents an independent invention.

In accordance with a preferred embodiment of the invention, the hearing aid is an ItE hearing aid, in which the otoplastic forms the outer housing itself. Alternatively, the hearing aid is a BtE hearing aid, the otoplastic of which is used for positioning a sound outlet of a sound tube or the loudspeaker in the auditory canal. Specifically, the hearing aid according to the invention is the hearing aid, the otoplastic of which is adapted by means of the above-described method. Therefore, the above-described method and the hearing aid described here and hereinafter (or also the otoplastic) share the respective advantages and features in a corresponding manner.

In a preferred embodiment of the invention—in particular in the case of the ItE hearing aid—the terminus plate, in particular the faceplate, and the loudspeaker as described above are already preinstalled. All components required for the later intended operation of the ItE hearing aid are preferably already correspondingly installed. In other words, the hearing aid is also fundamentally ready for use with uncured outer shell. As described above, preferably only the battery compartment door is removed from the faceplate and the pressure and curing facilitator is inserted into the battery opening to adapt the otoplastic of the hearing aid in this case.

In one expedient embodiment, the outer shell has an outer membrane and an inner membrane, which are both preferably formed from a rubber-elastic material. The curable material is introduced here into a gap space arranged between the outer membrane and inner membrane. This is expedient in particular for the case in which the curable material in the not yet cured state is in liquid and/or at least in a comparatively sticky state. The outer membrane and the inner membrane therefore form partition layers here, which prevent the curable material from being able to stick to the auditory canal wall and/or to the electrical components of the hearing aid.

In one preferred refinement, the outer membrane and the inner membrane are preferably spaced apart from one another by spacers, which predefine a thickness of the gap space arranged between them. It is thus advantageously possible to prevent, upon pressure application to the housing interior, the wall thickness of the outer shell from thinning due to displacement of the curable material, which is in particular free-flowing. These spacers are arranged, for example, in the form of ribs, domes, or the like on the inside of the outer membrane and/or the outside of the inner membrane. For example, the inner membrane is inserted into the outer membrane and spaced apart therefrom by means of the spacers. Subsequently, the gap space predetermined by means of the spacers is filled using the curable material. The gap space is optionally closed by a connection (for example, adhesive bonding, welding, or the like) of the loose ends of the inner membrane and the outer membrane.

In an alternative embodiment, the curable material is in a gel-type state in the intended intermediate manufacturing step, in which the material preferably has no surface stickiness and sufficient spatial cohesion. For example, this gel-type state is a partially cross-linked state in which the material still has a sufficiently high elasticity and/or plasticity. In this case, the outer shell is in particular formed by the gel-type curable material while omitting the above-described outside and inside partition membrane in particular.

The curable material is preferably a UV-curable epoxy resin, a UV-curable silicone resin, or the like.

The hearing aid system according to the invention comprises the above-described hearing aid and the above-described pressure and curing facilitator, which is configured and provided for connection to the pressure inlet opening of the hearing aid.

This pressure and curing facilitator is preferably a type of pin having a tip complementary to the pressure inlet opening, through which a pressure channel is guided. In one variant, the above-described UV lamp or diode or the above-described (tip) end of the optical fiber is seated at this tip.

The conjunction "and/or" is to be understood here and hereinafter in particular to mean that the features linked by means of this conjunction can be formed both jointly and also as alternatives to one another. By way of example, the elements A and/or B, would include the element A, or the element B, or both the elements A and B.

Other features which are considered as characteristic for the invention are set forth in the appended claims.

Although the invention is illustrated and described herein as embodied in a method for adapting an otoplastic of a hearing aid, hearing aid, and hearing aid system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 3 shows a method for adapting the hearing aid in a schematic flow chart.

Parts and elements that correspond with each other are identified with the same reference signs throughout the figures.

DETAILED DESCRIPTION OF THE INVENTION

Figure 1:
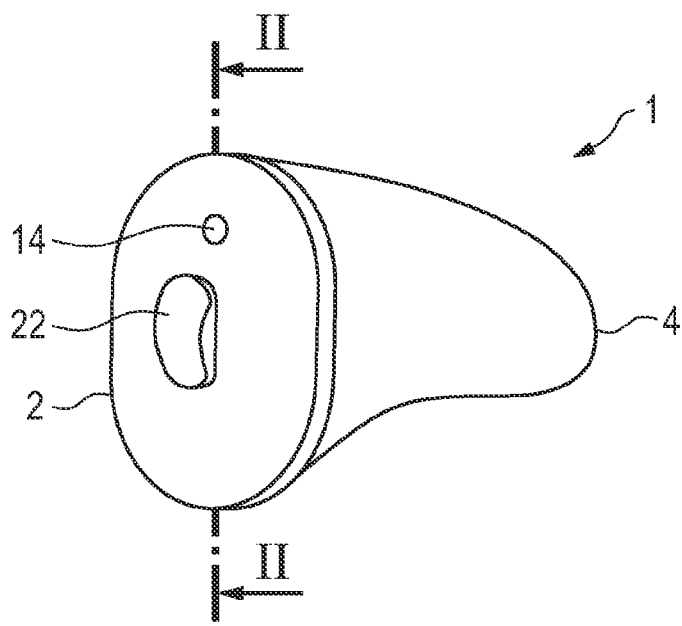
FIG. 1 shows a hearing aid in a schematic perspective view.
Figure 2:
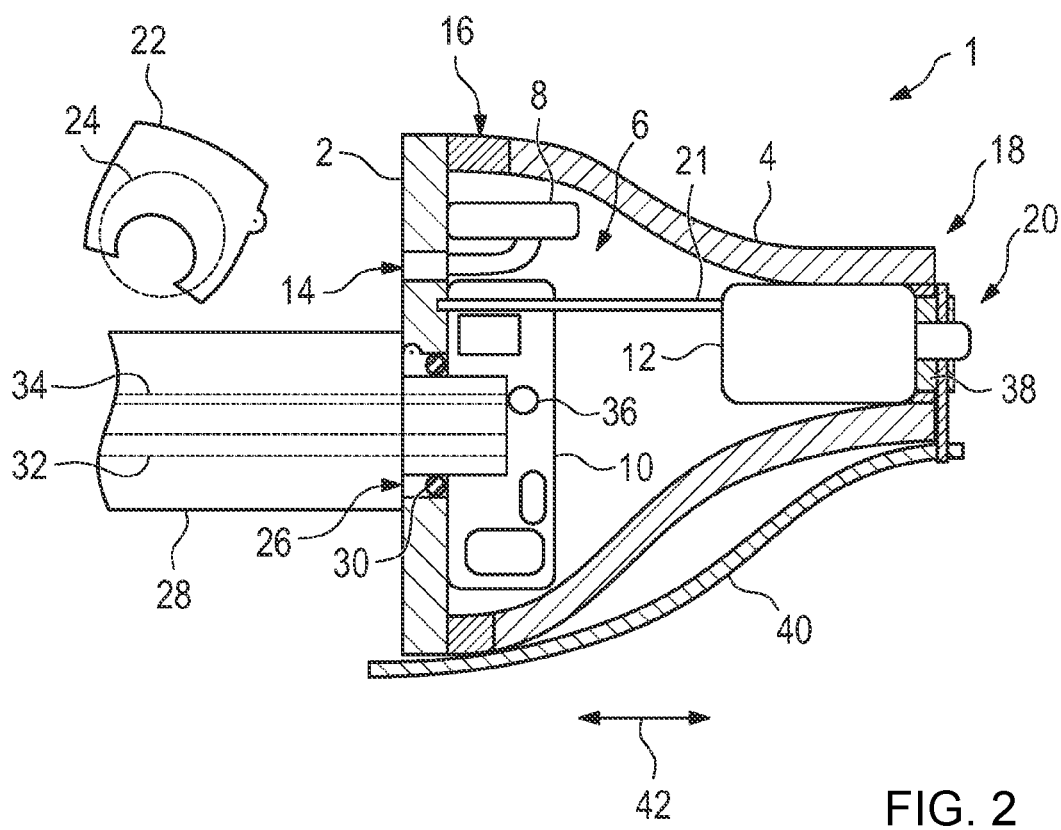
FIG. 2 shows a hearing aid system having the hearing aid therein in a schematic partially sectional view II-II according to FIG. 1.

Referring now to the figures of the drawing in detail and first, in particular, to FIG. 1 thereof, there is shown a hearing aid, specifically in the design form of an in-the-ear (ITE) hearing aid, abbreviated as "ItE 1." The ItE 1 has a faceplate 2 and an outer shell 4 connected to the faceplate. The faceplate 2 and the outer shell 4 define a housing interior 6 (see FIG. 2), which is used to accommodate electronic components of the ItE 1. A microphone 8, a signal processor 10, and a loudspeaker 12 form the electronic components arranged in the housing interior 6. The microphone 8 is fluidically coupled to a microphone opening 14 in the faceplate 2. The signal processor 10 is mounted just like the microphone 8 on the faceplate 2.

Since the ItE 1 is worn in an auditory canal of a hearing aid user or hearing aid wearer in an intended worn state, the outer shell 4 is adapted in a method described in greater detail hereinafter to the shape of the auditory canal and thus forms an outer wall of an otoplastic forming the housing of the ItE 1. In an intermediate manufacturing state or delivery state, the outer shell 4 is not yet adapted to the auditory canal (see FIG. 2). The outer shell 4 is formed of a material that is curable by UV light for the adaptation. This is introduced in a way not shown in greater detail between an outer membrane and an inner membrane. The membranes delimit the wall thickness of the outer shell 4 toward the outside and toward the housing interior 6, respectively. The faceplate 2 terminates the housing interior 6—viewed in relation to the intended worn state in the auditory canal—on the auditory canal outlet side. For this purpose, the faceplate 2 is connected in a media-tight manner to a rigid section 16 of the outer shell 4. An end 18 on the eardrum side, specifically a sound outlet opening 20 of the outer shell 4 arranged there, is closed by means of the loudspeaker 12. The end 18 facing toward the eardrum is referred to as the "proximal" end and the opposite end, at the faceplate, is referred to as the "distal" end. The loudspeaker 12 is positioned and held here in relation to the faceplate 2 by means of a holder in the form of a wire pin 21.

Referring now to FIG. 3, to adapt the ItE 1, in a first method step S1, the above-described ItE 1 is provided in its delivery state, i.e., having not-yet-cured outer shell 4. In a second method step S2, a battery compartment door 22, which is used for holding and positioning a battery 24 (only indicated in FIG. 2) in the housing interior 6 and for closing a corresponding battery opening 26, is removed from the faceplate 2. Subsequently, a pin 28 is inserted into the battery opening 26 and circumferentially sealed in relation to the battery opening 26 by means of a seal element 30. A pressure or air channel 32 and an optical fiber 34 extend in the pin 28. The pressure or air channel 32 therefore ends standing open on the tip side in the inserted state in the housing interior 6. The optical fiber 34 ends on the tip side in a spherical tip end 36, which is configured and provided for the purpose of homogeneously emitting UV radiation transported by means of the optical fiber 34 in the housing interior 6. The pin 28 is therefore used as a pressure and curing facilitator, specifically a radiation facilitator.

In a third method step S3, the ItE 1 is inserted by means of the pin 28 into the auditory canal of the hearing aid wearer and brought into its intended position in the auditory canal. In a further method step S4, air is pumped into the housing interior 6 via the pressure or air channel 32, which therefore applies an elevated internal pressure value to the housing interior 6. The curable and not yet cured material of the outer shell 4 is thus expanded approximately radially toward the outside. The wire pin 21 prevents lengthening of the outer shell 4 in the direction of the eardrum. The outer shell 4 is therefore inflated comparably to an air-filled balloon. The outer shell 4 thus presses against the auditory canal.

To enable venting of the auditory canal residual space remaining between the eardrum-side end 18 and the eardrum in the intended usage state or operating state of the ItE 1, a cord-shaped or tubular insert 40 is fastened on the eardrum-side end 18, specifically on a holding ring 38 for the loudspeaker 12, which extends in the longitudinal direction 42 along the outer shell 4. Under the action of the elevated internal pressure value, the outer shell 4 partially flows around this insert 40, so that a ventilation channel is formed in the outside of the outer shell 4. The rigid section 16 and the faceplate 2 have, in a form not shown in greater detail, a recess or the like, due to which the feedthrough of the insert 40 between the auditory canal wall and the rigid section 16 or the faceplate 2 past the latter is enabled. Notwithstanding the illustration, the faceplate 2 is smaller than the auditory canal diameter and the external diameter of the outer shell 4.

In a further method step S5, UV light is radiated into the housing interior 6 by means of the optical fiber 34 while maintaining the internal pressure value. Under the action of the UV light, the curing of the curable material of the outer shell 4 is initiated, so that it cross links and fixes the outer shell 4 in its shape adapted to the auditory canal. Subsequently, the ItE 1 is removed from the auditory canal, the insert 40 is removed, the pin 28 is removed from the battery opening 26, and the battery compartment door 22 is inserted again. The ItE 1 is thereupon adapted for individual use.

The subject matter of the invention is not restricted to the above-described exemplary embodiment. Rather, further embodiments of the invention can be derived by a person skilled in the art from the above description.

The following is a summary list of reference numerals and the corresponding structure used in the above description of the invention:
1 ItE (in-the-ear hearing aid)
2 faceplate
4 outer shell
6 housing interior
8 microphone
10 signal processor
12 loudspeaker
14 microphone opening
16 rigid section
18 end (proximal end)
20 sound outlet opening
21 wire pin
22 battery compartment door
24 battery
26 battery opening
28 pin
30 seal element
32 pressure or air channel
34 optical fiber
36 tip end
38 holding ring
40 insert
42 longitudinal direction
S1 method step
S2 method step
S3 method step
S4 method step
S5 method step

The invention claimed is:

1. A method for adapting an otoplastic of a hearing aid, the method comprising:
providing a flexible outer shell formed of a curable and not-yet-cured material, the flexible outer shell forming an outer wall of the otoplastic and defining a housing interior, wherein the housing interior is configured for accommodating electrical components;
sealing the housing interior at a proximal end thereof facing toward an eardrum in an intended worn state in an auditory canal of a hearing aid wearer and also sealing the housing interior at a distal end, opposite the proximal end, and installing a terminus plate at the distal end facing an auditory canal outlet side, and installing a loudspeaker at the proximal end on an eardrum side, on or in corresponding openings of the outer shell;
connecting the housing interior via a pressure inlet opening to a pressure and curing facilitator;
inserting the outer shell into the auditory canal of the hearing aid wearer;
applying an elevated internal pressure value to the housing interior via the pressure and curing facilitator, to press the outer shell against a wall of the auditory canal; and
initiating curing of the curable material via the pressure and curing facilitator while maintaining the internal pressure value.

2. The method according to claim 1, which comprises irradiating the outer shell via the pressure and curing facilitator to initiate a curing of the curable material.

3. The method according to claim 2, which comprises emitting radiation with the pressure and curing facilitator.

4. The method according to claim 1, which comprises sealing the distal end by installing a terminus plate being a faceplate.

5. The method according to claim 1, which comprises positioning the loudspeaker by way of a holder in an intended alignment relative to the terminus plate.

6. The method according to claim 1, which comprises inserting the pressure and curing facilitator in a gas-tight manner in a battery opening of the terminus plate forming the pressure inlet opening.

7. The method according to claim 6, which comprises temporarily removing a battery compartment door for closing the battery opening.

8. The method according to claim 1, which comprises placing an insert to form a ventilation channel in the outer shell between the proximal end on the eardrum side and the distal end on an auditory canal outlet side of the outer shell.

9. A hearing aid, comprising:
an outer shell, which forms an outer wall of an otoplastic of the hearing aid and which is formed from a flexible curable material that is not yet cured in an intended intermediate manufacturing step;
said outer wall defining a housing interior for accommodating electrical components;
said otoplastic being configured to be adapted to an auditory canal of a hearing aid wearer by:
sealing the housing interior at a proximal end thereof facing toward an eardrum in an intended worn state in an auditory canal of a hearing aid wearer and also sealing the housing interior at a distal end, opposite the proximal end, and installing a terminus plate at the distal end facing an auditory canal outlet side, and installing a loudspeaker at the proximal end on an eardrum side, on or in corresponding openings of the outer shell;
connecting the housing interior via a pressure inlet opening to a pressure and curing facilitator;
inserting the outer shell into the auditory canal of the hearing aid wearer;
applying an elevated internal pressure value to the housing interior via the pressure and curing facilitator, to press the outer shell against a wall of the auditory canal; and
initiating curing of the curable material via the pressure and curing facilitator while maintaining the internal pressure value.

10. The hearing aid according to claim 9, wherein said outer shell has an outer membrane and an inner membrane, and wherein said curable material is introduced into a gap space between said outer membrane and said inner membrane.

11. The hearing aid according to claim 9, wherein said curable material is in a gel-type state prior to curing, in the intended intermediate manufacturing step, and wherein said outer shell is formed by said curable material while omitting outside and inside partition membranes.

12. The hearing aid according to claim 11, wherein said curable material in the gel-type state exhibits no surface stickiness and spatial cohesion.

13. A hearing aid system, comprising:
a hearing aid according to claim 9; and
a pressure and curing facilitator configured for connection to a pressure inlet opening of said hearing aid.

* * * * *